United States Patent [19]

Walther

[11] Patent Number: 5,409,528
[45] Date of Patent: Apr. 25, 1995

[54] CORROSION INHIBITORS FOR COATINGS

[75] Inventor: James F. Walther, Mountain Lakes, N.J.

[73] Assignee: General Chemical Corporation, Parsippany, N.J.

[21] Appl. No.: 174,556

[22] Filed: Dec. 28, 1993

[51] Int. Cl.⁶ .................. C09D 5/08; C09D 191/00
[52] U.S. Cl. ........................ 106/14.34; 106/14.05; 106/14.14; 106/14.15; 106/14.21; 106/14.26; 106/14.31; 106/14.33; 106/14.37; 106/14.39; 106/14.41; 106/14.44; 428/457
[58] Field of Search ............... 106/14.14, 14.05, 14.15, 106/14.34, 14.37, 14.39, 14.31, 14.26, 14.33, 14.41, 14.44, 14.21; 428/457

[56] References Cited

U.S. PATENT DOCUMENTS

| | | | |
|---|---|---|---|
| 2,419,327 | 4/1947 | Wachter et al. | 252/392 |
| 2,432,839 | 12/1947 | Wachter et al. | 252/392 |
| 2,432,840 | 12/1947 | Wachter et al. | 252/392 |
| 2,596,450 | 5/1952 | Wachter et al. | 106/14 |
| 2,759,975 | 8/1956 | Chiddix et al. | 106/14.37 |
| 3,936,560 | 2/1976 | Santurri et al. | 106/14.37 |
| 4,116,701 | 9/1978 | Connor, Sr. | 106/14.14 |
| 4,226,624 | 10/1980 | Ohr | 106/14.37 |
| 4,743,466 | 5/1988 | Gysling et al. | 106/14.05 |
| 4,846,898 | 7/1989 | Natalie et al. | 106/14.21 |

FOREIGN PATENT DOCUMENTS 3-88880  4/1991  Japan .................. 106/14.37

*Primary Examiner*—Anthony Green
*Attorney, Agent, or Firm*—Arthur J. Plantamura

[57] ABSTRACT

A coating formulation containing as a corrosion inhibitor an effective amount of a tertiary or quaternary organo ammonium nitrite having a solubility such that it produces a concentration of nitrite ions in water of from about $1 \times 10^{-6}$ mol per liter to 5 mols per liter.

13 Claims, 1 Drawing Sheet

CORROSION INHIBITORS FOR COATINGS

This invention relates to improved coatings for metal substrates. More particularly, this invention relates to coatings that have improved corrosion resistance for iron-based metal substrates.

BACKGROUND OF THE INVENTION

The inhibition or elimination of rust formation has been a coatings goal for many years. Rust is formed by the oxidation of iron to form oxides of iron. Unlike some natural oxides such as aluminum oxide, which forms a fairly adherent oxide coating on the surface of aluminum, iron oxides are porous and the oxides do not adhere well to the underlying iron-based substrate. Thus iron-based substrates continue to form oxides in the presence of oxygen and water, eventually damaging the underlying structure.

Paints are one of the most cost effective coatings for iron structures. Various rust inhibitors are added to most paints; zinc chromate is particularly widely used. However, chromates must be used in fairly large quantities in paint to provide effective protection. Further, chromium is a heavy metal and thus poses a disposal problem. The costs of disposing of heavy metals such as chromium safely are increasing, and there are toxic dangers during disposal as well. However, in spite of environmental concerns, the elimination of chromates from paints has not been mandated until now because in truth there is no feasible substitute for chromates at the present time. Several other heavy metal compounds such as molybdates, phosphates and organic zinc compounds have also been tried, but they are much more expensive than zinc chromate, and they are much less effective in providing rust inhibition. Other heavy metals, such as lead, have already been banned due to their toxicity.

Other compounds have been suggested as corrosion inhibitors, particularly nitrites. Nitrites such as sodium nitrite are widely used to inhibit corrosion in water systems such as boilers, and they have been tried as rust inhibitors for paints as well, such as for flash rust inhibition in water based paints. In the short term, sodium nitrite is highly effective as a corrosion inhibitor, even at low concentration. For example, to inhibit the pitting of steel in water, about 65–160 ppm of chromate must be supplied, whereas only about 0.5–5 ppm of nitrite ion is equally effective. However, sodium nitrite is highly soluble in water, and thus is readily leached from the coatings over time, particularly in moist environments. Further, since sodium nitrite is highly soluble in water, it causes a paint coating to absorb water, which can result in blistering and lifting from the substrate by osmotic force as well.

Other metal nitrite salts, e.g., zinc nitrite, are also generally highly soluble in water, unlike metal chromates such as zinc or strontium chromate, which have low solubility in water. Thus metal nitrites cannot be substituted for zinc chromate in paint formulations.

More than forty years ago, organo amine nitrites were suggested as corrosion inhibitors for coatings. For example, U.S. Pat. No. 2,596,450 to Wachter discloses organo nitrites which are the reaction product of various amines and nitrous acid in a slightly basic mixture. While tertiary and quaternary amines are suggested, all of the Examples use secondary amines. These compounds, while they may be effective as corrosion inhibitors, can convert to nitrosamine compounds, which are known to be toxic, and typically are carcinogenic in even trace amounts. Thus such compounds cannot be used as paint coatings in today's environmentally sensitive era.

Tertiary amine nitrites were suggested for use as corrosion inhibitors in coatings in U.S. Pat. No. 2,432,840 to Wachter wherein an object of the invention was to provide corrosion inhibitors which were soluble in both organic materials and water, without restriction of their solubility. Wachter had no understanding that the solubility of the amine nitrites would have any effect on their use in paint formulations.

The early disclosures by Wachter clearly have not provided environmentally safe, cost-effective anti-corrosion additives for paint coatings, and thus the search continues in order to find a substitute for zinc chromate.

SUMMARY OF THE INVENTION

I have found a class of organic tertiary or quaternary ammonium nitrite salts having fairly low solubility in water, low diffusion rates and oleophilic properties that, when added to film forming resin-based coating formulations comprising an organic resin and a solvent, will prevent or inhibit rust formation for extended periods of time. The low solubility of these compounds provides a reservoir of nitrite ions which are slowly released into water that penetrates the coating or that is present at defects in the coating in moist environments, thereby providing long term corrosion protection. These compounds do not form nitrosamines in the presence of water.

DETAILED DESCRIPTION OF THE INVENTION

Figure 1:
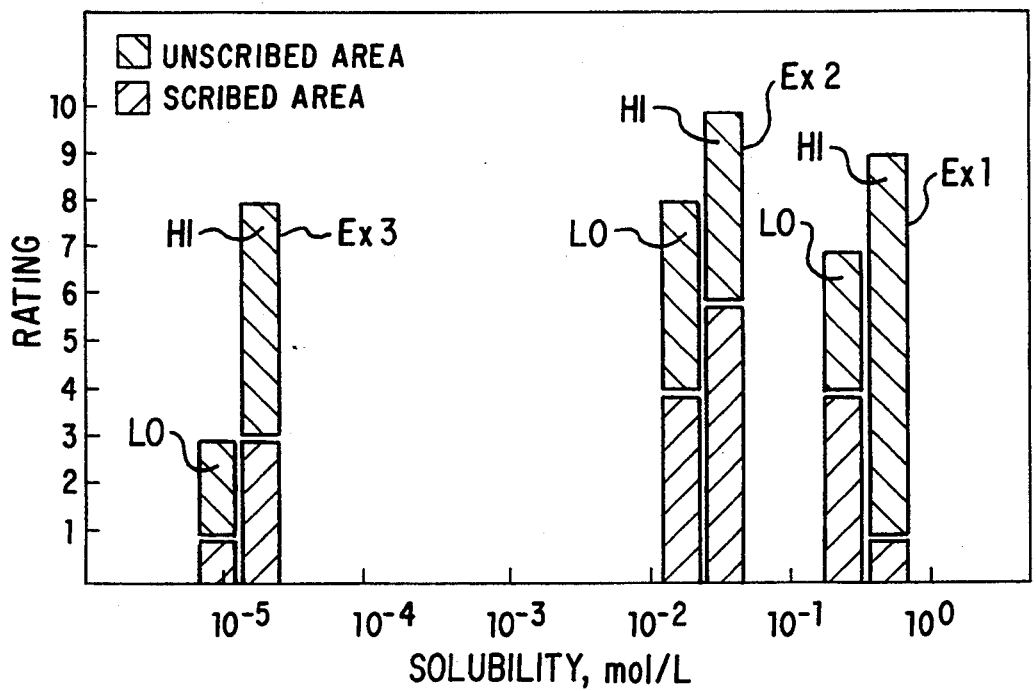
FIG. 1 is a graph of performance rating versus solubility of various inhibitor formulations.

The organo nitrites useful herein have a controlled solubility in water that produces a concentration of nitrite ions of about $1 \times 10^{-6}$ mol/L to 5 mols/L, and preferably from $1 \times 10^{-5}$ mol/L to 0.5 mol/L in coating formulations. The most preferred solubility of nitrite ions is from about $1 \times 10^{-4}$ mol/L to 0.1 mol/L. These materials can be made by reaction of tertiary and quaternary organic ammonium chloride compounds with sodium nitrite. The amine and sodium nitrite starting materials are readily available commercially, and, because the organic ammonium nitrites are tertiary and quaternary derivatives, these compounds do not form toxic nitrosamines, as do primary and secondary ammonium compounds. These organo nitrites, when added to coating formulations including an organic resin, which can be organic or water-based coating formulations, provide long term protection to underlying metal, e.g., iron-based metals.

The solubility of the organo nitrite in water is very important; it must be high enough to provide a nitrite concentration sufficient to inhibit corrosion in water that penetrates the coatings, or that is present at defects in the coating. However, too low a concentration of nitrite may even enhance pitting or corrosion of the underlying metal. The nitrite concentration may be required to be higher when corrosion producing ions such as chloride or sulfate are present. On the other hand, too high a concentration will promote water absorption into the coatings by osmosis, thereby causing failure of the coating by blistering, and leaching of the ammonium nitrite from the coating. This process will also reduce the effectiveness of the rust inhibiting action of the coating.

The quaternary organo nitrite inhibitors useful herein have the formula

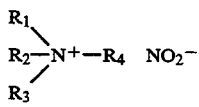

wherein $R_1$, $R_2$, $R_3$ and $R_4$ independently at each occurrence are primarily hydrocarbon-based groups, which can be aliphatic, alicyclic, heterocyclic, aromatic or alkylated cyclic groups. Aliphatic groups which may be entirely alkyl or can contain one or more olefinic double bonds, are particularly suitable because of their abundant availability, low cost and compatibility with coating systems. Preferably at least one of the four groups $R_1$ to $R_4$ are long chain alkyl groups of 15 carbon atoms or more to obtain the proper solubility. Long chain groups, e.g., $C_{15}$, provide lower solubility in water than short chain groups, for example $C_1$ to $C_5$, and the compounds of the invention can be tailored by proper choice of the length of the groups, and/or total number of carbon atoms, as for branched chain or cyclic groups, so that the solubility requirements of the present invention are met. The measure of suitability of organo nitrites coating formulations in accordance with the present invention is that of solubility; the solubility in water of the organo nitrites must meet the criteria set forth above.

Tertiary organo ammonium nitrites are also suitable, again providing they meet the solubility criteria demanded by the present application. The tertiary organo ammonium nitrites useful herein have the formula

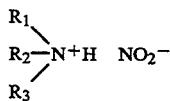

wherein $R_1$, $R_2$ and $R_3$ have the meanings given above.

Primary and secondary ammonium nitrites are not useful herein because they are or can form toxic compounds.

The selection of the composition of the R groups in the quaternary and tertiary ammonium nitrites, in addition to their effect on solubility, also can contribute corrosion inhibition, as is known. For this purpose, the formulation may include an organic ammonium cation corrosion inhibitor that enhances the corrosion inhibitors over the nitrite ion. For example, quaternary ammonium chloride salts are known corrosion inhibitors, and the length and nature of the primarily hydrocarbon cation also contribute to the corrosion inhibiting aspect of the invention. Their effect on the thermal and chemical stability of the ammonium nitrite compounds is also known to those skilled in the art.

The coating formulations of the invention may also include additional known corrosion inhibiting pigments of controlled low solubility, such as zinc based pigments.

A preferred preparation of the compounds useful herein is as follows: a chloride salt of a quaternary or tertiary ammonium as defined above is dissolved in a solvent mixture such as 50% hexane and 50% t-amyl alcohol; the solution is added to a solution of about 20% sodium nitrite in water using a stoichiometric excess of sodium nitrite over the amount of amine chloride, and mixed thoroughly. The organic layer is washed with water to remove chloride, dried with magnesium sulfate and the solvent stripped under vacuum. An organo ammonium nitrite yield of 85–98% is readily achieved. Little or no oxidation to nitrate is observed, even after heating in air. Other methods of preparation are described by Wachter in U.S. Pat. No. 2,432,840.

Quaternary ammonium nitrites are preferred over tertiary ammonium nitrites herein because the tertiary ammonium cation has an ionizable hydrogen ion attached to the nitrogen atom, which can be neutralized in the presence of a base. This may affect the solubility, and therefore the effectiveness, of the inhibitor.

An effective amount of the above corrosion inhibitors can be added to any standard coating formulations, whether oil based or water based. The nature of the coating formulation is not a part of the present invention. Standard paint coatings include primer and finishing paints, industrial maintenance paints, paints for bridges and the like, as well as finishes for automobiles and appliances and the like. In addition to standard paint coating formulations, the present organo nitrites can be added to clear lacquers and varnishes, as well as to temporary coatings such as greases, oils and waxes that are used to protect unpainted parts or structures, such as unpainted parts in storage, oil field equipment exposed to the atmosphere and the like.

The invention will be further described by means of the following examples. However, the invention is not meant to be limited to the details set forth therein.

Examples and Controls

Three organo nitrite compounds, having a solubility in water varying over several orders of magnitude, were prepared from commercially available organo ammonium chlorides and sodium nitrite using the mixed solvent method described hereinabove.

The compound of Example 1 was heptadecyl trimethyl ammonium nitrite which has the formula

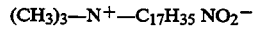

It has a solubility in water of about 0.3 mol/L.

The compound of Example 2 was dihexadecyldimethylammonium nitrite, which has the formula

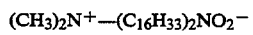

It has a solubility in water of about 0.025 mol/L.

The compound of Example 3 was tripentadecylmethylammonium nitrite, which has the formula

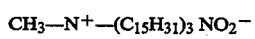

It has a solubility in water of about $1.3 \times 10^{-5}$ mol/L.

The above organo ammonium nitrites were added to an epoxy primer paint base in a solvent, supplied by Shell Chemical as Eponol 55-BH-30, as were the controls. The formulations are set forth in Table I below. Amounts are given in % by volume. The additives of the Examples 1–3 were added at "low loading" and at "high loading", an order of magnitude higher loading, as indicated in Table I. The pigment-to-binder volume ratio was held at 0.57 for all of the formulations.

TABLE I

| Sample | Inhibitor | Amount | Nuosperse, 657 | Resin | Solvent | Talc |
|---|---|---|---|---|---|---|
| A | Deft Epoxy[(1)] ZnCrO4 | 3.16 | 0.25 | 12.82 | 79.60 | 4.17 |
| B | ZnCrO4[(2)] | 3.16 | 0.25 | 12.82 | 79.60 | 4.17 |
| C | ZnMoO4[(3)] | 3.16 | 0.25 | 12.82 | 79.60 | 4.17 |
| D | "Unicoat"[(4)] | 3.16 | 0.25 | 12.82 | 79.60 | 4.17 |
| E | none | — | 0.25 | 12.82 | 79.60 | 7.33 |
| F | Ex 1 (low) | 0.32 | 0.25 | 12.77 | 79.35 | 7.31 |
| G | Ex 2 (low) | 0.32 | 0.25 | 12.77 | 79.35 | 7.31 |
| H | Ex 3 (low) | 0.32 | 0.25 | 12.77 | 79.35 | 7.31 |
| I | Ex 1 (high) | 3.16 | 0.24 | 12.41 | 77.09 | 7.10 |
| J | Ex 2 (high) | 3.16 | 0.24 | 12.41 | 77.09 | 7.10 |
| K | Ex 3 (high) | 3.16 | 0.24 | 12.41 | 77.09 | 7.10 |
| L | Ex 2 + ZnMoO4[(5)] | 3.16 | 0.24 | 12.41 | 77.09 | 3.94 |

[(1)]Deft primer (02-Y-24 epoxy MIL P233770 containing basic zinc chromate as corrosion inhibitor
[(2)]Lansco 243-XF, (basic zinc chromate)
[(3)]MolyWhite 151 (zinc molybdate) of Sherwin Williams Co.
[(4)]NADC, a combination of 17.6 parts by weight of zinc molybdate (Molywhite 151), 10.0 parts by weight of zinc phosphate (Mineral Pigments J0852) and 1.0 part by weight organic zinc (BASF Sicorin RZ)
[(5)]amount for each inhibitor The primer paint formulations were applied to steel panels in accordance with ASTM D1654-79a and dried. The panels of the Examples were then exposed to a salt spray test in accordance with ASTM test B117-85 for 7 days. A chemical color test showed that nitrite was still present in the primer coating.

A second series of the primer paints of the Examples and Controls was applied to steel panels and dried, and a top urethane paint coating, Chemglaze A-276 of Lord Corporation, as also applied and dried. A scribe mark was made in each of the panels. The panels were then exposed to the salt spray test as above.

The salt spray test was continued for 1000 hours, and the various panels examined in accordance with ASTM D1654-79a. The paint coatings were then stripped from the panels with a chemical paint stripper and again examined in accordance with ASTM test D 1654-79a, wherein a rating of 10 is excellent and a rating of 0 is worst. Dramatic differences in corrosion protection were found among the various panels. The data are given below in Table II.

TABLE II

| Sample | Unscribed Area Coating | Unscribed Area W/O Coating | Scribed Area Coating | Scribed Area W/O Coating |
|---|---|---|---|---|
| A | 7 | 10 | 3 | 2 |
| B | 8 | 0 | 4 | 3 |
| C | 7 | 0 | 4 | 3 |
| D | 8 | 0 | 3 | 2 |
| E | 9 | 0 | 5 | 3 |
| F | 7 | 7 | 4 | 4 |
| G | 8 | 8 | 4 | 4 |
| H | 8 | 3 | 5 | 1 |
| I | 8 | 9 | 0 | 1 |
| J | 8 | 10 | 5 | 6 |
| K | 8 | 8 | 3 | 3 |
| L | 5 | 9 | 3 | 3 |

The above results illustrate, particularly with the coatings removed, that the present formulations containing inhibitors of the invention (Samples F-L) prevented corrosion of the panels, and that the corrosion around scribes was reduced, relative to control formulations. Using the higher loading amount of the least soluble organo ammonium nitrite of Sample K, and both high and low loadings of the organo nitrite of intermediate solubility of samples G and J, and low loading of the most soluble organo nitrite of Sample F, gave particularly good results.

However, the least soluble organo nitrite of Samples H and K did not provide completely safe levels of nitrite as there was mild pitting corrosion in the underfilm region, and more so at the scribe, and pitting corrosion was worse at the lower loading (Sample H) than the control with no inhibitor, Sample E. This result showed that there is a critical lower limit of solubility required for effective corrosion inhibition. Furthermore, the higher loading of the most soluble organic nitrite of Sample I was poor in the scribed area where considerable leaching of the organo nitrite and lifting of the coating occurred. This result showed that the solubility of the organo nitrite of Example I was too high.

FIG. 1 is a graph showing the ratings of the above ammonium nitrites versus their solubility, in mols/L. It is apparent that the highest rating, and most effective inhibitor was the moderately soluble compound of Example 2. Zinc chromate inhibitor was inferior to all of the inhibitors of the present invention.

It is clear from the results that corrosion inhibition by the organo nitrites of the invention is affected by their solubility. The solubility should be high enough to provide a minimum critical concentration of nitrite ions in moisture that penetrates the coatings, and the solubility should not be so high as to promote water absorption into the coating which causes blistering and lifting of the coating and leaching of the organo nitrite inhibitor. The results further show that the effective solubility range is approximately the range of solubilities of the compounds of Examples 1, 2 and 3. The solubility range is affected by the presence of corrosion-promoting substances in the exposure environment, such as chloride and sulfate ions, where a higher minimum solubility may be required than in the absence of such substances.

Figure 2:
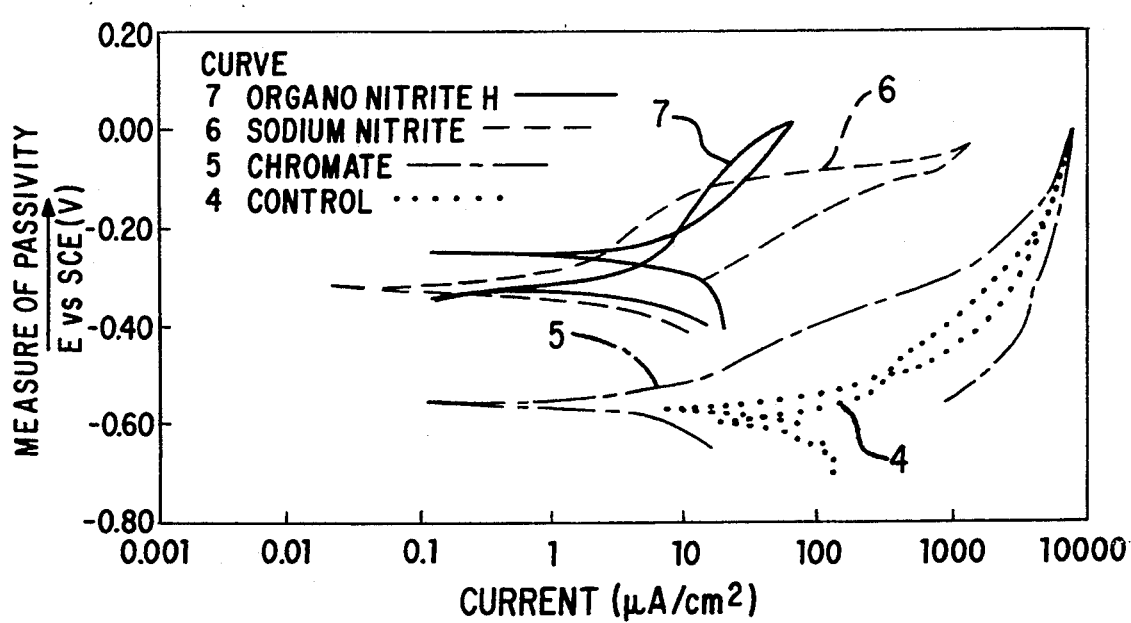
FIG. 2 is a graph of anodic polarization curves comparing corrosion inhibiting properties of additives in a dilute salt solution.

A comparison of a high solubility organo nitrite of the invention with sodium nitrite and potassium chromate was made by means of anodic polarization measurements of steel, and are shown in FIG. 2. The inhibitor concentration was 0.014 mols per liter in 1% sodium chloride solution in all cases. Referring to FIG. 2, curve 4 is a control using no inhibitor; curve 5 is sodium chromate inhibitor; curve 6 is sodium nitrite inhibitor and curve 7 is the organo nitrite of Example 1.

The order of corrosion inhibition is: the organo nitrite is greater than sodium nitrite; which is much greater than sodium chromate; which is greater than the control (no inhibitor). The results show that the organo ammonium cation of the organo nitrite provides enhanced corrosion inhibition over that of the nitrite anion alone.

Although the invention has been described by means of particular examples, various changes can be made to the coating formulations of paints and other coatings including addition of other organo ammonium nitrites of intermediate solubility; the additions of an effective amount of a zinc-, molybdenum- or phosphorus-based corrosion inhibitor; the addition of known inhibitors such as zinc chromate or zinc molybdate; the use of corrosion-inhibiting organo ammonium cations for the nitrite compounds, and the substitution of various other primer and top coat paint formulations, and the like. Such variations will be obvious to one skilled in the art and are meant to be included herein. The invention is only meant to be limited by the appended claims.

I claim:

1. A formulation comprising a film forming resin-based coating composition and a corrosion inhibitor comprising one or more members selected from the group consisting of tertiary ammonium nitrites and quaternary ammonium nitrites having a solubility in water such that the solubility of said ammonium nitrites provide a concentration of nitrite ions in water of from about $1 \times 10^{-6}$ mol per liter to 5 mols per liter.

2. A formulation according to claim 1 wherein said corrosion inhibitor has a solubility such that the solubility produces a concentration of nitrite ions in water of from about $1 \times 10^{-5}$ mol per liter to 0.5 mol per liter.

3. A formulation according to claim 1 wherein said corrosion inhibitor has a solubility such that the solubility produces a concentration of nitrite ions in water of from about $1 \times 10^{-4}$ mol per liter to 0.1 mol per liter.

4. A formulation according to claim 1 wherein said corrosion inhibitor has the formula

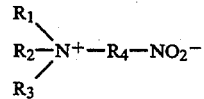

wherein $R_1$, $R_2$, $R_3$, and $R_4$ independently at each occurrence are aliphatic, alicyclic, heterocyclic, aromatic or alkylated cyclic groups and additionally $R_4$ may be hydrogen.

5. A formulation according to claim 4 wherein at least one of $R_1$ to $R_4$ is a long chain alkyl group having about 15 or more carbon atoms.

6. A formulation according to claim 5 wherein at least two of $R_1$ to $R_4$ are said long chain alkyl groups.

7. A formulation according to claim 5 wherein at least three of $R_1$ to $R_4$ are said long chain alkyl groups.

8. A formulation according to claim 4 wherein $R_4$ is hydrogen

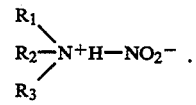

9. A formulation according to claim 1 further comprising an organic ammonium cation corrosion inhibitor that enhances the corrosion inhibition over the nitrite ions of the said ammonium nitrites.

10. A formulation according to claim 1 further comprising a zinc-, molybdenum- or phosphorus-based corrosion inhibitor in an amount effective to enhance the said ammonium nitrites inhibitor.

11. An iron-based metal article having a coating of a formulation of claim 1.

12. A formulation comprising a hydrocarbon selected from the group consisting of an oil, a grease and a wax and a corrosion inhibitor comprising one or more members selected from the group consisting of tertiary ammonium nitrites and quaternary ammonium nitrites having a solubility in water such that the solubility of said ammonium nitrites provide a concentration of nitrite ions in water of from about $1 \times 10^{-6}$ mol per liter to 5 mols per liter.

13. An iron-based metal article having a coating of a formulation of claim 12.

* * * * *